UNITED STATES PATENT OFFICE 2,285,184

PEST CONTROL

Euclid W. Bousquet, Wilmington, and Hubert G. Guy, Newark, Del., assignors to E. I. du Pont de Nemours & Company, Wilmington, Del., a corporation of Delaware No Drawing. Application January 10, 1941, Serial No. 373,959

22 Claims. (Cl. 167—30)

This invention relates to pest control and is particularly directed to methods and compositions for preventing, arresting, or eradicating infestations of insects and like organisms which commonly infest or attack organic matter, whether plant or animal or of plant or animal origin, either in the natural or the fabricated state, and especially to compositions for attaining these ends in which the essential active ingredient is a compound selected from the group consisting of aromatic and cycloaliphatic amines which have an amino hydrogen replaced by a 2-alkenylthiocarbamyl group. These compounds are thioureas in which one nitrogen group contains as a substituent a 2-alkenyl group and the other is the residue of an aromatic or cycloaliphatic amine.

It is set forth in numerous U. S. and foreign patents that the thioureas are in general destructive to all forms of insect life, and examples specifically include thiocarbanilide, allylthiourea, phenylthiourea, orthotolylthiourea, and N-valeryl-N'-phenylthiourea. Among such patents may be mentioned U. S. Patents 1,573,490; 1,734,519; 1,748,579; 1,748,580; and British Patents 326,567; 257,644; 301,421; and 337,823.

The observations in certain of these patents about the general suitability of the thioureas for insect control have not been realized, and to the contrary our observations tend to show that very few of the thioureas have any value for insect control. Also, Minaeff and Wright, Industrial and Engineering Chemistry, vol. 21, p. 1190, 1939, report that thiocarbanilide and di-ortho-tolyl-thiourea have little value for mothproofing, and Kerns and Flint, Journal of Economic Entomology, vol. 30, pp. 159 and 164, 1937, indicate that cyclohexylthiourea does not show any insecticidal activity toward aphids and red spider.

We have now discovered a particular class of thioureas which are outstandingly effective in the control of leaf-eating insects such as the Mexican bean beetle and the Japanese beetle and likewise are effective in the control of other chewing insect pests such as the common clothes moth. This particular class of thioureas includes those in which one of the nitrogen groups attached to the thio-carbonyl group is the residue of a 2-alkenylamine and the other nitrogen group similarly attached to the thiocarbonyl group is the residue of an aromatic or cycloaliphatic amine. In other words, they are aromatic or cycloaliphatic amines in which an amino hydrogen is replaced by a 2-alkenylthiocarbamyl group.

These thioureas may be represented by the general formula

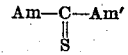

in which Am is the residue of a 2-alkenylamine and Am' is the residue of an aromatic or cycloaliphatic amine. Am, for example, may be the residue of allyl, methallyl crotyl, 2-hexenyl, 1-methyl-2-propenyl, 1-ethyl-2-butenyl, and 3-methyl-2-butenyl amines and their N-substituted analogues. Am', for example, may be the residue of aniline and its C- or N-substituted analogues, or of naphthylamine and its C- or N-substituted analogues, or of furylamine and its C- or N-substituted analogues, or of cyclohexylamine or its C- or N-substituted analogues, or of benzylamine and its C- or N-substituted analogues, or of fenchylamine and its C- or N-substituted analogues, or of piperidine and its C-substituted analogues, or of morpholine and its C-substituted analogues, or of reduced petroleum bases or of pyrrolidine and the like. In any of these amines the N-substituent may be either aliphatic or aromatic as long as it is such a radical as does not destroy the basic nature of the amine. Acyl radicals, for example, which would convert the amine to an amide are not included. The C-substituents may be aliphatic, aromatic or inorganic. Thus they may be halogen, nitro or alkyl, alkoxy, aryl, aryloxy or acyl. Water solubilizing groups such as sulfonic, carboxy and the like are also included but preferably the compounds are water-insoluble. The amines may be either primary or secondary in order to have a replaceable amino hydrogen. When such hydrogen is removed we have the "amine residue" as the term is used herein. In the thioureas of this invention the replaceable amino hydrogen valency links one type of amine residue to the other type of amine residue through the thiocarbonyl group.

These thioureas may be readily prepared by common synthetic methods, as for example by the reaction of an isothiocyanate with an amine. The compounds of greatest interest, and also most easily and cheaply available, are obtainable by the reaction of an allyl mustard oil with a primary or secondary amine containing an aromatic substituent. The following examples are illustrative.

EXAMPLE I

N-allyl-N'-phenylthiourea

A solution of 991.1 parts of allyl isothiocyanate and 1230 parts of benzene is heated to 50° C. and 930.6 parts of aniline is added at such a rate as to keep the temperature at 50-60° C. with the aid of mild external cooling. To complete the reaction, the solution is then heated with stirring at 70° C. for one-half hour, cooled to 5° C., and the crystals filtered off. After washing three times with benzene and drying, a yield of 1728 parts (90 per cent of theoretical) of coarse, white crystals melting at 99-101° C. is obtained.

EXAMPLE II

N, N'-diallyl-N-phenylthiourea

In a steam-jacketed evaporator, 40 parts of N-allyl-aniline and 30 parts of allyl isothiocyanate dissolved in 180 parts of methanol are slowly boiled until, after three hours, all of the solvent is removed. A yield of 68 parts (97 per cent of the theoretical) of N, N'-diallyl-N-phenylthiourea is obtained as a reddish-brown oil.

EXAMPLE III

N-methallyl-N'-phenylthiourea

A solution of 18.6 parts of aniline and 22.6 parts of methallyl isothiocyanate in 80 parts of benzene is heated in a steam-jacketed reactor for two hours. The product is recovered by evaporating the solvent and recrystallizing the residue from 85 per cent ethanol. A yield of 20 parts of product melting at 76-7° C. is obtained.

EXAMPLE IV

N-allyl-N'-benzylthiourea

To a solution of 32.1 parts of benzylamine in 120 parts of benzene there is added with stirring and cooling to keep the temperature at 60-70° C., 29.7 parts of allyl mustard oil. After the temperature effect subsides, the solution is heated at 70° C. for 15 minutes. Then 120 parts of ligroin is added and the solution is cooled, the product precipitating out as white granular crystals melting at 92-3° C. The yield is 59.2 parts, or 96% of the theoretical.

EXAMPLE V

N-allyl-N'-beta-naphthylthiourea

A solution of 28.6 parts of beta-naphthylamine and 20 parts of allyl isothiocyanate in 80 parts of methanol is heated at the reflux for two hours. The product is recovered by evaporating the filtrate and recrystallizing the residue from aqueous methanol. The yield of N-allyl-N'-beta-naphthylthiourea is 29 parts of white crystals melting at 108-9° C. and containing 13.30% of sulfur (calculated value is 13.22%).

EXAMPLE VI

N-allyl-N'-(4-chloro-2-methylphenyl)-thiourea

A solution of 42.5 parts of 4-chloro-o-toluidine (B. P. 91-2°/4 mm.) and 29.8 parts of allyl mustard oil in 120 parts of benzene is heated at 80-85° C. for two hours. At the end of this time, 120 parts of ligroin is added and the solution cooled. The product precipitates as fine white scales melting at 94-6° C. The yield is 49 parts or 68% of the theoretical.

The relative effectiveness of the compounds of this invention in the control of Mexican bean beetle as compared with other types of thioureas is illustrated in the following tables. The test compounds were applied to bean plants either as a spray or a dust in the concentrations indicated. The treated plants are then exposed to attack by Mexican bean beetle either in the larvae or adult state as indicated. Control plants similarly treated with the same concentration of a standard stomach poison, such as lead or calcium arsenate, are also exposed to attack at the same time and under the same conditions.

TABLE I

Control of Mexican bean beetles, adults

| Thiourea | Conc.** | Performance* | Control* |
|---|---|---|---|
| N, N'-diphenyl | 0.5% S | 0-22 | Pb arsenate 80-4. |
| N, N'-di-p-tolyl | 10.0% D | 0-85 | Ca arsenate 100-1. |
| N, N'-di-alpha-naphthyl | 0.5% S | 10-100 | Ca arsenate 30-2. |
| N-allyl | 0.5% S | 80-10*** | Ca arsenate 87-5. |
| N-p-nitrophenyl | 0.5% S | 3-75 | Ca arsenate 30-2. |
| N-allyl-N'-phenyl | 1.0% S | 30-3 | Pb arsenate 85-4. |

*The first figure represents the insect mortality while the figure following the hyphen represents the percentage of foliage eaten.
**S represents an aqueous spray; D indicates a talc dust.
***The bean foliage was severely burned by this compound.

The data given in this table are not directly comparable but must be compared thru the control. Thus N-allyl-N'-phenylthiourea is as effective as lead arsenate in preventing foliage damage though not so lethal. None of the other five thioureas were as effective as the control. As a matter of fact the only compounds, N-allylthiourea, which sufficiently approached the effectiveness of the control to be of interest so severely injured foliage to be of little value.

TABLE II

Control of Mexican bean beetle, larvae

| Thiourea | Conc.** | Performance* | Ca arsenate control* |
|---|---|---|---|
| Bis-3-(dibenzofuryl) | 0.5% S | 0-100 | 92-2 |
| N,N'-bis-p-aminophenyl | 1.0% D | 26-50 | 66-5 |
| N,N'-di (tert.amylphenyl) | 1.0% D | 40-75 | 90-1 |
| N-allyl-N'-o-tolyl | 0.5% D | 40-10 | 10-20 |
| N-allyl-N'-m-tolyl | 0.5% D | 90-5 | 10-20 |
| N-allyl-N'-p-tolyl | 0.5% D | 50-10 | 10-20 |
| The N-allyl thiocarbamide of reduced petroleum bases, having average molecular weight 155. | 0.5% D | 96-3 | 80-5 |
| 4-(N-allyl-thiocarbamyl) morpholine. | 1.0% D | 100-0 | 66-5 |
| N-allyl-N'-cyclohexyl | 1.0% D | 96-10 | 96-5 |
| N-allyl-N'-o-methoxyphenyl | 5.0% D | 100-1 | 100-1 |
| N-allyl-N'-beta-naphthyl | 5.0% D | 100-1 | 100-1 |

*The first figure represents the insect mortality; the figure following the hyphen represents the percentage of foliage eaten.
**S represents an aqueous spray, D indicates a talc dust.

The compounds in Table II also are not directly comparable but must be compared thru the control. It is significant to note that only those thioureas which fall within the scope of this invention are as effective or more effective than the control.

In the following table are listed the results obtained in testing a number of thioureas for the control of Japanese beetles. The tests were conducted by the standard cage method described in U. S. Patent 2,205,232.

Table III

*Control of Japanese beetles*

| Thiourea | Conc. | Smart weed foliage eaten |
|---|---|---|
|  |  | Percent |
| N-allyl | 1:100 | 100 |
| N,N'-bis (p-aminophenyl) | 1:200 | 100 |
| N,N'-(p,p'-difluorodiphenyl) | 1:100 | 62 |
| N,N'-di-o-tolyl | 1:200 | 87 |
| N,N'-di-alpha-naphthyl | 1:200 | 100 |
| N,N'-di-m-tolyl | 1:200 | 100 |
| N-lauryl-N'-(p-ethoxyphenyl) | 1:100 | 100 |
| N-m-tolyl | 1:200 | 95 |
| N-allyl-N'-lauryl | 1:100 | 60 |
| N,N'-diphenyl | 1:200 | 68 |
| N-allyl-N'-phenyl | 1:100 | 3 |
| N-allyl-N'-phenyl | 1:400 | 9 |
| N-methallyl-N'-phenyl | 1:400 | 8.3 |
| N-allyl-N'-benzyl | 1:200 | 10 |
| N,N'-diallyl-N-phenyl | 1:200 | 12 |
| N-allyl-N'-(4-chloro-2-methylphenyl) | 1:800 | 33 |
| Lead arsenate | 1:100 | 8-10 |
| Lead arsenate | 1:200 | 10-22 |
| Lead arsenate | 1:400 | 15-25 |
| Lead arsenate | 1:600 | 33 |

The results listed in Table III are directly comparable, and also are comparable with reference to the lead arsenate controls and represent the over-all efficiency of the compound tested as a foliage protectant. Very few materials are known which inhibit feeding of the Japanese beetle to the same extent that lead arsenate does, and it is unusual to find a series of compounds so highly effective as the last six compounds listed in the table.

The compounds of this invention are also effective as mothproofing agents. The data given in Table IV are illustrative. The effectiveness of the test compound is determined by standardized and rigorous tests in which specimens of fluffy woolen fabrics are first impregnated with acetone solutions of the test compound, dried and then exposed to moth larvae for a period of two weeks under conditions in which untreated check specimens are damaged to the extent of 50 to 90 per cent and not more than 10 per cent of the larvae die.

Table IV

*Control of the common clothes moth*

| Thiourea | Conc.* | Performance** |
|---|---|---|
|  | Percent |  |
| N-allyl-N'-octyl | 1 | 10-62 |
| N, N'-diphenyl | 2 | 20-30 |
| N, N'-di-alpha-naphthyl | 2 | 5-80 |
| N, N'-di-m-tolyl | 2 | 0-65 |
| N-allyl-N'-dodecyl | 2 | 0-60 |
| N-lauryl-N'-(p-ethyoxyphenyl) | 1 | 0-60 |
| N-allyl-N'-o-tolyl | 2 | 60-5 |
| N-allyl-N'-m-tolyl | 2 | 50-2 |
| N-allyl-N'-p-tolyl | 2 | 55-2 |
| N-allyl-N'-beta-naphthyl | 2 | 85-7 |
| N-methallyl-N'-phenyl | 2 | 55-9 |
| 4 (N-allylthiocarbamyl) morpholine | 2 | 60-6 |
| N-allyl-N'-cyclohexyl | 2 | 90-7 |

\* This is the concentration of the impregnating solution and represents approximately the concentration of the compound in the test fabric.

\*\*The first figure is the percentage of moth larvae killed after two weeks exposure while the second figure indicates the percentage of surface nap visibly damaged by the larvae.

Data given in the foregoing tables will serve to illustrate our invention and clearly to distinguish it from the prior art. It is to be understood, however, that the invention is not limited by the examples given but in its broader aspects is directed to and includes compounds of the type in which a thiocarbonyl group links two amine residues, one of which is the residue of a 2-alkenyl amine and the other of which is the residue of an aromatic or cycloaliphatic amine. It is also to be understood that many of the compounds listed for comparative purposes are not of the prior art but are included in the tables as indicative of the specificity of the particular compounds to which the present invention relates. It is also to be understood that the data given in the tables are neither complete nor quantitative but are merely comparative and that there may be instances in which thioureas of the prior art may be more effective than the thioureas of the present invention and that particular instances may arise in which thioureas of the present invention are less effective. For example, N-allylthiourea is a highly effective mothproofing agent, whereas N-allyl-N'-phenyl-thiourea is not so effective.

The thioureas of this invention are most suitably applied in compositions containing inert diluents, for example, in compositions such as are set forth in U. S. Patent 2,161,462. Such compositions may be applied either as aqueous suspensions or as a dust. Other types of wetting agents may be employed, or the wetting agent may be omitted. Conventional spreaders or stickers may be used. The compounds may also be applied from solution in common solvents and such solutions may be emulsified either for spray purposes or for application to fabrics. Other insecticidal agents may be included such as lead and calcium arsenates, sodium, barium and triethanolamine fluosilicates, phenothiazine, organic thiocyanates generally, for example, as set forth in U. S. Patent 2,203,919, nicotine and its salts or the so-called fixed nicotines, rotenone and rotenone-containing insecticides such as extract of cube, etc., pyrethrum insecticides, isobutylundecylenamide, and like insecticides. They may also include bactericides and fungicides such as Bordeaux mixture, Burgundy mixture, the cupric chelates of salicylaldehyde, beta-ketoesters or acylacetones, any of the so-called insoluble coppers such as copper oxy chloride, cupric oxide and the like, salts of polychlorinated phenols, organic mercurials, esters of butenedioic acids, cyclic amino methyl sulfides, and the like fungicides.

The thioureas of this invention either alone or in suitable compositions may be used as foliage protectants, mothproofing agents, as toxic ingredients in poison baits, and in like insecticidal applications. They are particularly effective in controlling chewing insects such as the common clothes moth, the Mexican bean beetle and the Japanese beetle. Leaf-eating insects such as the last two mentioned are in particular effectively controlled.

We claim:

1. An insect control composition containing as an essential active ingredient a 2-alkenyl thiocarbamide of an amine selected from the class consisting of aromatic and cycloaliphatic amines.

2. An insect control composition containing as an essential active ingredient a compound of the type

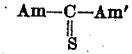

in which Am is the residue of 2-alkenyl amine and Am' is the residue of an aromatic amine.

3. An insect control composition containing as an essential active ingredient a compound of the type

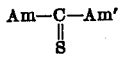

in which Am is the residue of allyl amine and Am' is the residue of an aromatic amine.

4. An insect control composition containing as an essential active ingredient a compound of the type

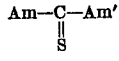

in which Am is the residue of methallyl amine and Am' is the residue of an aromatic amine.

5. An insect control composition containing as an essential active ingredient a 2-alkenyl thiocarbamide of a carbocyclic amine.

6. An insect control composition containing as an essential active ingredient a 2-alkenyl thiocarbamide of an aromatic amine of the benzene series.

7. An insect control composition containing as an essential active ingredient a 2-alkenyl thiocarbamide of a carbocyclic aromatic amine.

8. An insect control composition containing an N(2-alkenyl)-N'-arylthiourea.

9. An insect control composition containing as an essential active ingredient N-allyl-N'-(4-chloro-2-methyl-phenyl)thiourea.

10. An insect control composition containing as an essential active ingredient N-methallyl-N'-phenyl thiourea.

11. An insect control composition containing as an essential active ingredient N-allyl-N'-cyclohexyl thiourea.

12. The method of protecting organic matter from attack by insect pests which comprises treating the organic matter with a 2-alkenyl thiocarbamide of an amine selected from the class consisting of aromatic and cycloaliphatic amines.

13. The method of protecting organic matter from attack by insect pests which comprises treating the organic matter with a compound of the type

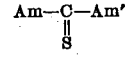

in which Am is the residue of 2-alkenyl amine and Am' is the residue of an aromatic amine.

14. The method of protecting organic matter from attack by insect pests which comprises treating the organic matter with a compound of the type

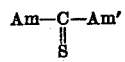

in which Am is the residue of allyl amine and Am' is the residue of an aromatic amine.

15. The method of protecting organic matter from attack by insect pests which comprises treating the organic matter with a compound of the type

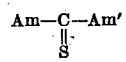

in which Am is the residue of methallyl amine and Am' is the residue of an aromatic amine.

16. The method of protecting organic matter from attack by insect pests which comprises treating the organic matter with a 2-alkenyl thiocarbamide of a carbocyclic amine.

17. The method of protecting organic matter from attack by insect pests which comprises treating the organic matter with a 2-alkenyl thiocarbamide of an aromatic amine of the benzene series.

18. The method of protecting organic matter from attack by insect pests which comprises treating the organic matter with a 2-alkenyl thiocarbamide of a carbocyclic aromatic amine.

19. The method of protecting organic matter from attack by insect pests which comprises treating the organic matter with an N(2-alkenyl)-N'-arylthiourea.

20. The method of protecting organic matter from attack by insect pests which comprises treating the organic matter with N-allyl-N'-(4-chloro-2-methylphenyl)thiourea.

21. The method of protecting organic matter from attack by insect pests which comprises treating the organic matter with N-methallyl-N'-phenyl thiourea.

22. The method of protecting organic matter from attack by insect pests which comprises treating the organic matter with N-allyl-N'-cyclohexyl thiourea.

EUCLID W. BOUSQUET.
HUBERT G. GUY.